Sept. 2, 1958 R. L. LEIGH 2,849,763
THRESHOLD AND SEAL ASSEMBLY
Filed July 12, 1956
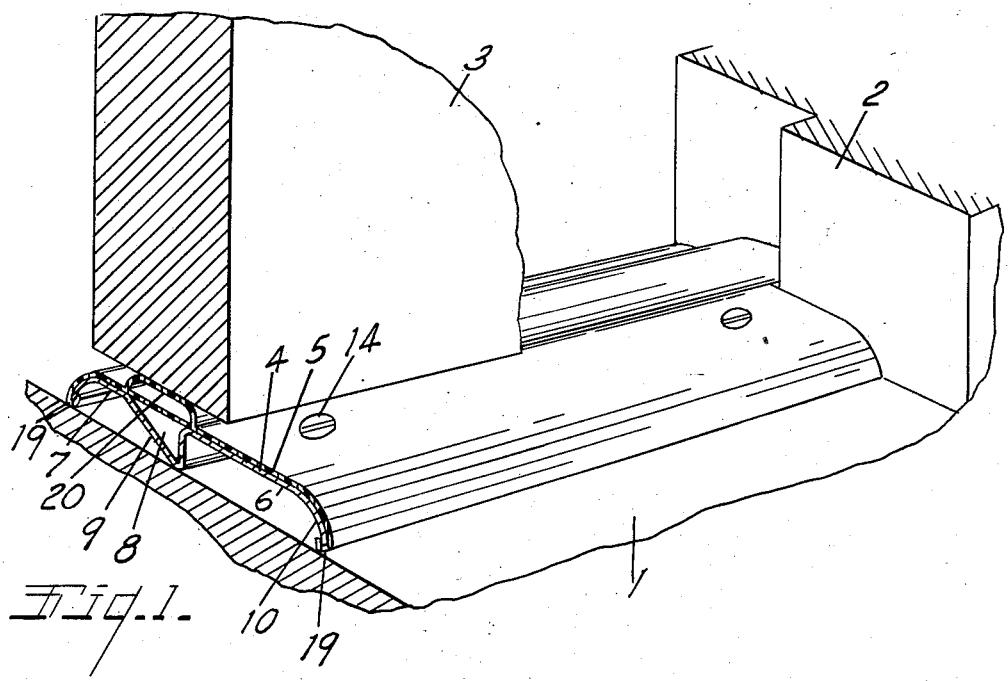
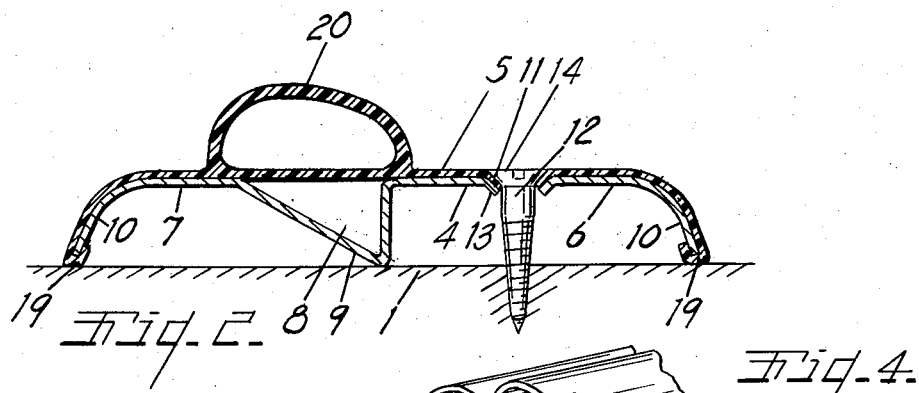
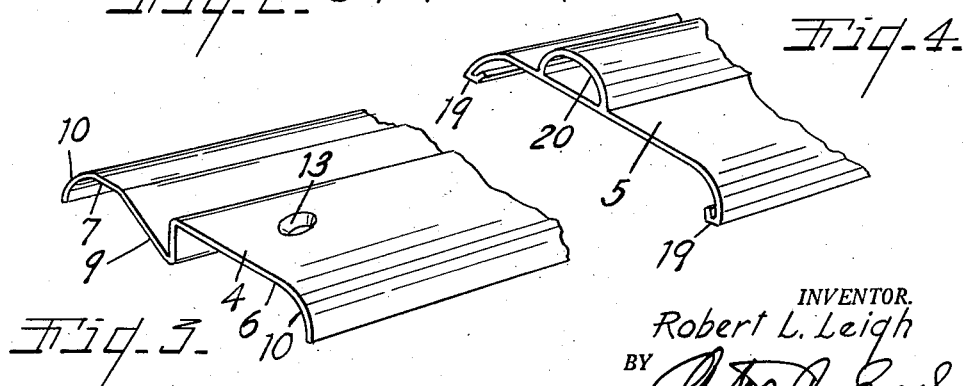
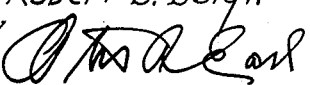
INVENTOR.
Robert L. Leigh
BY
ATTORNEY.

United States Patent Office 2,849,763
Patented Sept. 2, 1958

2,849,763

THRESHOLD AND SEAL ASSEMBLY

Robert L. Leigh, Coopersville, Mich., assignor to Air Control Products, Inc., Coopersville, Mich.

Application July 12, 1956, Serial No. 597,538

9 Claims. (Cl. 20—64)

This invention relates to a threshold and seal assembly which constitutes a unitary structure for handling and installing.

The main objects of this invention are:

First, to provide a threshold and seal assembly comprising a unitary body member, a unitary cover and seal member supportedly mounted thereon and constituting a cover and presenting an anti-slip surface.

Second, to provide a threshold and seal assembly comprising a body member, cover and seal member in which the combined cover and seal member may be desirably formed of vinyl plastic which has the characteristics of being wear resistant, is not slippery and at the same time is yieldably conformable to the supporting body.

Third, to provide a threshold and seal assembly which provides an effective seal between the assembly and the surface on which it is mounted and also a seal for the fasteners, the seal not only extruding dirt but also substantially extruding moisture.

Fourth, to provide a combined threshold and seal assembly in which there are no dirt collecting recesses.

Objects relating to details and economies of the invention will appear from the description to follow. The invention is defined and pointed out in the claims.

A preferred embodiment of the invention is illustrated in the accompanying drawing, in which:

Fig. 1 is a fragmentary perspective view of a threshold assembly embodying my invention in operative relation to a supporting surface, casing and door.

Fig. 2 is a cross sectional view.

Fig. 3 is a fragmentary perspective view of the body member of my threshold assembly.

Fig. 4 is a perspective view of the body member cover and seal unit of my invention.

In the accompanying drawing 1 represents the floor surface, 2 the door casing and 3 a door. These parts are conventionally illustrated for the purpose of showing how the threshold and seal assembly of my invention is installed in relation to such parts.

The seal assembly of my invention comprises a body member designated generally by the numeral 4 and a cover member designated generally by the numeral 5, the cover member embracingly covering the body member as is clearly illustrated in Figs. 1 and 2.

The body member comprises substantially flat or planar top portions 6 and 7 disposed in spaced parallel relation with the longitudinally extending upwardly facing recess 8 between. This recess is formed by a downward offset 9 in the stock of the body member which may desirably be of sheet metal. The edge portions of the body member are curved downwardly to provide flange-like support portions 10. The top portion 6 has fastener openings 11 therein adapted to receive securing screws 12. The metal around these openings is conformed to provide counter sinks 13 for the heads of the attaching screws 14.

The cover member 5 is preferably formed of vinyl plastic which has the desirable qualities of being substantially non-elastic and at the same time being flexibly resilient and can be readily molded. The cover member is arranged on the body member in bridging relation to the longitudinal recess thereof and in supported relation to the top surfaces 6 and 7 and the downwardly curved edge portions 10 being in fitting embracing relation thereto.

The edges of the cover member are turned inwardly at 19 to embrace the edges of the flange-like support portions 10 of the body member. This provides retaining engagement as well as providing seals between the assembly and the surface on which the assembly is mounted.

The body member is provided with a longitudinal tubular seal portion 20 which is disposed above the recess 8. The walls of this tubular portion 20 are desirably substantially thicker than the remaining portions of the cover member which are in direct supported relation to the body member. It will be noted that the side edges of the tubular portion are in supported relation to the top surfaces of the body member. The covering conformed of plastic may be of a desired color. When the assembly is mounted the space under the threshold is effectively sealed against dirt and also substantially against water. The cover extends into the counter sinks and provides seals for the fasteners.

The body member illustrated is formed of sheet metal and can be readily and economically produced from that stock. However it may, if desired, be formed by extrusion and it has no complicated angles or recesses. The non or anti-slip feature is also an important factor as thresholds formed of metal tend to be slippery.

I have illustrated and described my invention in a highly practical embodiment thereof. I have not attempted to illustrate or describe other embodiments or adaptations which I contemplate as it is believed this disclosure will enable those skilled in the art to embody or adapt my invention as may be desired.

Having thus described the invention, what is claimed as new and is desired to be secured by Letters Patent is:

1. A threshold and seal assembly comprising a unitary body member integrally conformed of sheet stock of uniform thickness and having spaced parallel substantially flat top portions, the outer edges of the top portions being extended into downwardly curved edge supports, the body member having a portion thereof between its said top portions offset downwardly and defining an upwardly facing longitudinal recess between the top portions, the said downwardly offset portion constituting an intermediate support for said top portions, one of said top portions having counter sunk fastener openings therein, and a unitary cover member of vinyl plastic supportedly arranged on said body member in bridging relation to its said longitudinal recess and having edge portions embracing the edges of said edge support portions of said body member and constituting seals between them and the surface on which the threshold is disposed, said cover member including a horizontally flattened longitudinally extending resiliently yieldable tubular seal portion disposed above said recess of said body member with its side edges in supported relation to the said top portions of said body member, portions of the cover member extending into the counter sinks of the fastener openings and constituting seals for the heads of fasteners which may be disposed therein.

2. A threshold and seal assembly comprising a unitary body member integrally conformed of sheet stock of uniform thickness and having spaced parallel substantially flat top portions, the outer edges of the top portions being extended into downwardly curved edge supports, the body member having a portion thereof between its said top portions offset downwardly and defining an upwardly facing longitudinal recess between the top portions, the said downwardly offset portion constituting an intermediate support for said top portions, and a unitary cover member of vinyl plastic supportedly arranged on said body member in bringing relation to its said longitudinal recess and having edge portions embracing the edges of said edge support portions of said body member and constituting seals between them and the surface on which the threshold is disposed, said cover member including a horizontally flattened longitudinally extending resiliently yieldable tubular seal portion disposed above said recess of said body member with its side edges in supported relation to the said top portions of said body member.

3. A threshold and seal assembly comprising a unitary body member having spaced top portions, the top portions having downwardly projecting flange-like supports at their outer edges, the body member having a portion thereof between its said top portions offset downwardly and defining an upwardly facing longitudinal recess between its top portions, said downwardly offset portion constituting an intermediate support for said top portions, and a cover member of resiliently flexible material conformed to and supportedly arranged on said body member in bridging relation to said longitudinal recess therein and having inwardly turned edge portions retainingly engaged with the edges of said edge support portions of said body member and constituting seals between the body member and the surface on which it is disposed, said cover member including a longitudinally extending resiliently yieldable tubular seal portion disposed above said recess of said body member with the side edges thereof in supported relation to said top portions of said body member.

4. A threshold and seal assembly comprising a unitary body member having spaced top portions, the top portions having downwardly projecting flange-like supports at their outer edges, the body member having a portion having an upwardly facing longitudinal recess between its top portions, and a cover member of resiliently flexible material conformed to and supportedly arranged on said body member in bridging relation to said longitudinal recess therein and having inwardly turned edge portions retainingly engaged with the edges of said edge support portions of said body member and constituting seals between the body member and the surface on which it is disposed, said cover member including a longitudinally extending resiliently yieldable seal portion disposed above said recess of said body member.

5. A threshold and seal assembly comprising a unitary body member having spaced top portion, the top portions having downwardly projecting flange-like supports at their outer edges, the body member having a portion having an upwardly facing longitudinal recess between its top portions, one of said top portions having counter sunk fastener openings therein, and a cover member of resiliently flexible material conformed to and supportedly arranged on said body member in bridging relation to said longitudinal recess therein and having inwardly turned edge portions retainingly engaged with the edges of said edge support portions of said body member and constituting seals between the body member and the surface on which it is disposed, said cover member including a longitudinally extending resiliently yieldable seal portion disposed above said recess of said body member, portions of the cover member extending into the counter sinks of the fastener openings and constituting seals for the heads of fasteners which may be disposed therein.

6. A threshold and seal assembly comprising a body member including a top having curved downwardly projecting flange-like supports on its longitudinal edges, said top having counter sunk fastener openings therein, and a unitary cover member conformed to and supportedly arranged on said body member and having inwardly turned edge portions retainingly embracing the edges of said edge support portions of said body member and constituting seals between the body member and a surface on which it is disposed, said cover member including an upwardly projecting longitudinally extending resiliently flexible seal portion disposed intermediate the side edges of said body member, portions of the cover member extending into the counter sinks of the fastener openings and constituting seals for the heads of fasteners which may be disposed therein.

7. A combined threshold and seal assembly comprising a body member having planar top portions and an upwardly facing longitudinal recess between said top portions, the top portions having downwardly projecting flange-like edge portions at their outer edges constituting supports, and a substantially non-elastic resiliently flexible cover member fixedly embracing said body member and having inturned edges disposed below the edges of said support member and having a longitudinally extending resiliently yieldable upwardly projecting enlargement disposed above said recess in said body member.

8. A threshold and seal assembly comprising a body member having laterally spaced parallel substantially flat top portions, the outer edges of the top portions being extended into downwardly directed supporting members, the body member having a continuous longitudinal portion thereof between its said flat top portions offset downwardly and defining an upwardly facing longitudinal channel-like recess between its said top portions, and a cover member of resiliently flexible material fittingly conformed to and supportedly arranged on said body member with an intermediate portion thereof in bridging relation to said longitudinal recess therein, said cover member having an integral resiliently yieldable tubular seal portion disposed above said recess of said body member and normally projecting above the same and with its side edges in overlapping supported relation to said top portions of said body member, the portion of said cover member bridging said recess being normally in the plane of the top portions of the cover member.

9. A threshold and seal assembly comprising a body member having laterally spaced parallel substantially flat top portions, the outer edges of the top portions being extended into downturned supporting members, the body member having an upwardly facing longitudinal channel-like recess between its said top portions, and a non-metallic cover member conformed to and supportedly arranged on said body member in bridging relation to said longitudinal recess therein and having an integral resiliently yieldable tubular seal portion wider than and disposed above said recess of said body member with the side edge portions in overlapping supported relation to said top portions of said body member.

References Cited in the file of this patent

UNITED STATES PATENTS

| | | |
|---|---|---|
| 317,630 | Cramer | May 12, 1885 |
| 2,661,229 | Slaughter | Dec. 1, 1953 |

FOREIGN PATENTS

| | | |
|---|---|---|
| 484,095 | Germany | Oct. 10, 1929 |
| 512,986 | Great Britain | Oct. 2, 1939 |